(12) United States Patent
Seifert

(10) Patent No.: US 7,400,812 B2
(45) Date of Patent: Jul. 15, 2008

(54) APPARATUS AND METHODS FOR ACCOMMODATING LOOPS OF OPTICAL FIBER

(75) Inventor: Martin Seifert, West Simsbury, CT (US)

(73) Assignee: Nufern, East Granby, CT (US)

( * ) Notice: Subject to any disclaimer, the term of this patent is extended or adjusted under 35 U.S.C. 154(b) by 0 days.

(21) Appl. No.: 10/573,436

(22) PCT Filed: Sep. 27, 2004

(86) PCT No.: PCT/US2004/031723

§ 371 (c)(1),
(2), (4) Date: Mar. 24, 2006

(87) PCT Pub. No.: WO2005/031401

PCT Pub. Date: Apr. 7, 2005

(65) Prior Publication Data
US 2007/0036505 A1     Feb. 15, 2007

Related U.S. Application Data

(60) Provisional application No. 60/506,022, filed on Sep. 25, 2003.

(51) Int. Cl.
*G02B 6/00* (2006.01)
(52) U.S. Cl. ........................ 385/135; 385/134; 385/136; 385/137; 385/86; 385/46; 385/12; 385/76
(58) Field of Classification Search ......... 385/134–137, 385/46, 76, 12, 86; 350/96.15–16, 320
See application file for complete search history.

(56) References Cited

U.S. PATENT DOCUMENTS 3,808,549 A    4/1974   Maurer
4,403,152 A    9/1983   Schmid et al.
4,442,350 A    4/1984   Rashleigh
4,564,289 A    1/1986   Spillman, Jr.
4,730,887 A *  3/1988   Boscher et al. ............... 385/46

(Continued)

FOREIGN PATENT DOCUMENTS

CH          683950 A5     6/1994

(Continued)

OTHER PUBLICATIONS

Form PCT/ISA/210; International Search Report for Application No. PCT/US04/31723, Jun. 23, 2005 (2 pages).

(Continued)

*Primary Examiner*—Frank G. Font
*Assistant Examiner*—Guy G Anderson
(74) *Attorney, Agent, or Firm*—Peter J. Rainville

(57) ABSTRACT

Disclosed is an optical apparatus (10, 110, 410, 610) for accommodating optical fiber, such as one or more loops of optical fiber. The optical apparatus (10, 110, 410, 610) can include a body (12, 112, 412, 612) comprising an inwardly facing surface (16, 116, 416, 616) adapted for receiving a plurality of loops of a length of optical fiber. The body (16, 116, 416, 616) can include at least a portion (75) wherein the inwardly facing surface is continuous between two adjacent loops (79). Methods and apparatus are disclosed for disposing the optical fiber with an optical apparatus (10, 110, 410, 610) for accommodating the optical fiber.

22 Claims, 11 Drawing Sheets

U.S. PATENT DOCUMENTS

| | | | |
|---|---|---|---|
| 4,734,577 A | 3/1988 | Szuchy | |
| 4,797,607 A | 1/1989 | Dupraz | |
| 4,815,079 A | 3/1989 | Snitzer | |
| 4,850,098 A | 7/1989 | Yurek | |
| 5,053,693 A | 10/1991 | Bohnert et al. | |
| 5,085,501 A | 2/1992 | Sakuma et al. | |
| 5,101,449 A | 3/1992 | Takeuchi et al. | |
| 5,134,882 A | 8/1992 | Taylor | |
| 5,136,235 A | 8/1992 | Brandle et al. | |
| 5,155,621 A | 10/1992 | Takeda et al. | |
| 5,475,216 A | 12/1995 | Danver et al. | |
| 5,481,358 A | 1/1996 | Dyott et al. | |
| 5,533,163 A | 7/1996 | Muendel | |
| 5,570,449 A | 10/1996 | Hutchison et al. | |
| 5,673,866 A | 10/1997 | Albert et al. | |
| 5,710,853 A | 1/1998 | Von Hoessle et al. | |
| 5,838,858 A * | 11/1998 | White | 385/76 |
| 5,864,645 A | 1/1999 | Zellmer | |
| 5,949,941 A | 9/1999 | DiGiovanni | |
| 6,137,940 A | 10/2000 | Rageot | |
| 6,157,763 A | 12/2000 | Grubb | |
| 6,226,438 B1 | 5/2001 | Bylander et al. | |
| 6,334,020 B1 | 12/2001 | Fujimori et al. | |
| 6,424,784 B1 * | 7/2002 | Olson | 385/135 |
| 6,477,307 B1 | 11/2002 | Tankala | |
| 6,483,973 B1 | 11/2002 | Mazzarese | |
| 6,496,301 B1 | 12/2002 | Koplow et al. | |
| 6,549,330 B1 | 4/2003 | Choi et al. | |
| 6,560,009 B1 | 5/2003 | Andrejco et al. | |
| 6,618,540 B2 | 9/2003 | Wu et al. | |
| 6,707,975 B2 | 3/2004 | Bueschelberger et al. | |
| 6,724,528 B2 | 4/2004 | Koplow et al. | |
| 6,795,633 B2 | 9/2004 | Joseph, II | |
| 6,825,974 B2 | 11/2004 | Kliner | |
| 6,944,387 B2 * | 9/2005 | Howell et al. | 385/135 |
| 6,968,112 B2 | 11/2005 | Zamel et al. | |
| 6,973,250 B2 | 12/2005 | Sabry et al. | |
| 2002/0149839 A1 | 10/2002 | Hamoir | |

FOREIGN PATENT DOCUMENTS

| | | |
|---|---|---|
| JP | 4303816 | 10/1992 |
| JP | 5142265 | 6/1993 |
| JP | 8210861 | 8/1996 |
| WO | WO 2005/031401 A3 | 4/2005 |

OTHER PUBLICATIONS

Form PCT/ISA/237; Written Opinion of the ISA for Application No. PCT/US04/31723, Jun. 23, 2005 (6 pages).

* cited by examiner

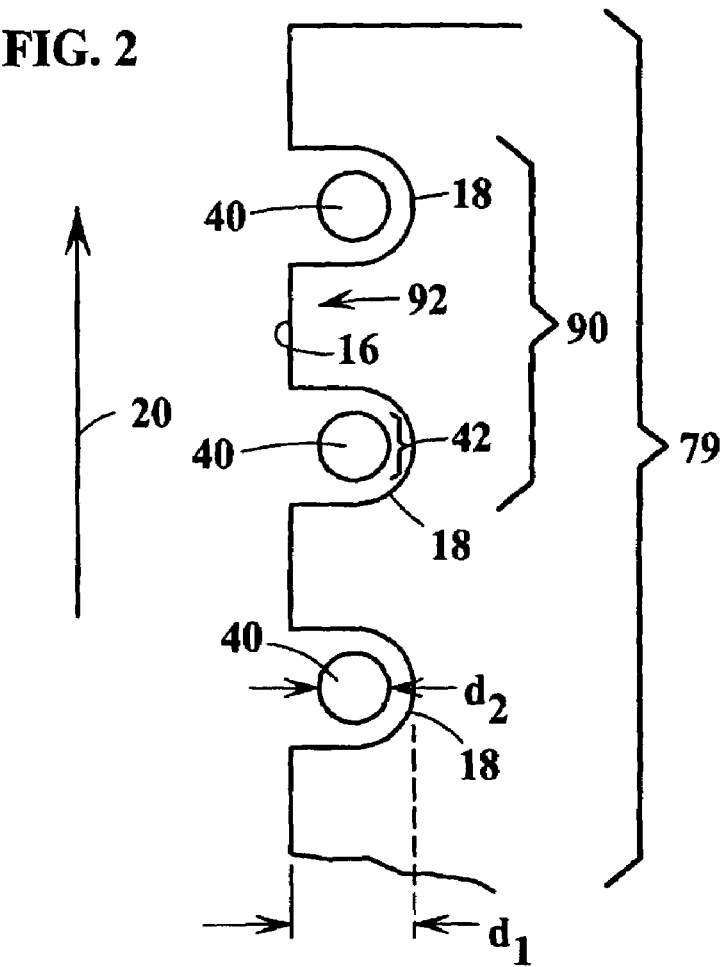
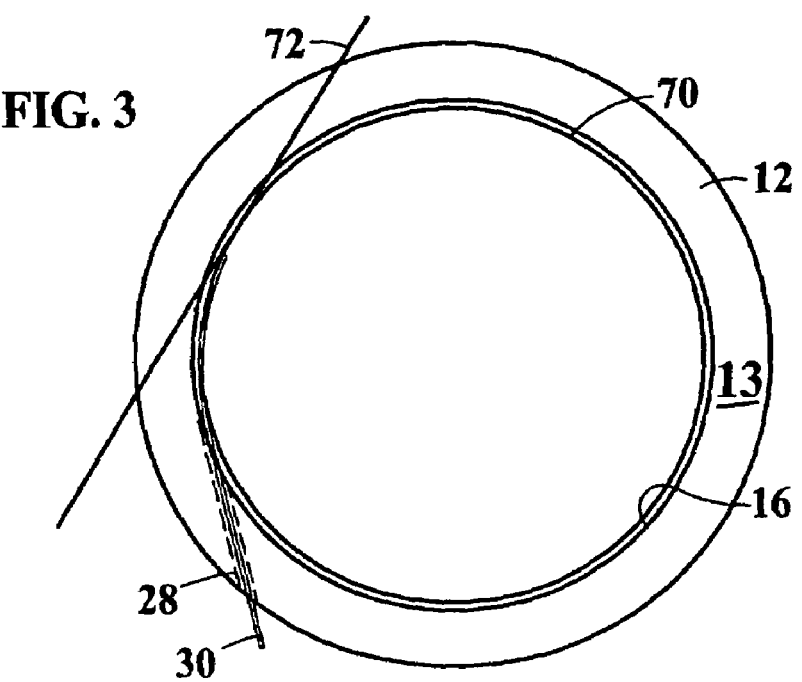

APPARATUS AND METHODS FOR ACCOMMODATING LOOPS OF OPTICAL FIBER

CROSS-REFERENCE TO RELATED APPLICATIONS

This is a national stage application of PCT/US2004/031723, filed Sep. 27, 2004, which in turn claims priority to U.S. Provisional Patent Application No. 60/506,022, filed Sep. 25, 2003.

FIELD OF THE INVENTION

The present invention relates to optical fiber, and more particularly, to apparatus and methods for accommodating a length of optical fiber, such as, for example, a length having a plurality of loops of optical fiber.

BACKGROUND

Optical fiber is highly desirable as a medium for transmitting, conditioning or even generating optical energy. Such optical energy can, but need not in all cases, carry information, such as voice or data signals. Optical fiber can, depending on its design, be suitable for use over long as well as short distances, provide low loss as well as a high bandwidth, and can be insensitive to electromagnetic interference. The bandwidth of a single optical fiber is enormous, and can be enlarged even further using optical multiplexing techniques.

In many applications the optical fiber being used is quite mechanically flexible, and must be used in longer lengths, such as when the fiber is used in, for example, amplifiers, lasers or delay lines. In such applications the fiber is typically wound about the outside of a support structure, such as a tube, such that the fiber can be more efficiently stored and take up less physical space, which can be at a premium. Such a technique for accommodating a longer length of fiber, though widespread, is not without certain disadvantages, and in certain instances improvements would be welcome.

SUMMARY OF THE INVENTION

It is an object of the present invention to address one or more disadvantages or drawbacks of the prior art.

In one aspect of the invention, there is provided an apparatus for accommodating optical fiber, comprising a body having an inwardly facing surface for receiving a plurality of loops of a length of optical fiber, where the body includes at least a portion wherein the inwardly facing surface is continuous between two adjacent loops.

The surface can be adapted such that at least the majority of all of the loops to be received by the surface will be received so as to be substantially coaxial. The surface can comprise a helical groove for receiving the loops of optical fiber.

In another aspect, there is provided an optical apparatus, comprising a length of optical fiber comprising a rare earth, the length of optical fiber comprising a plurality of loops and a body comprising an inwardly facing surface receiving the plurality of loops of the length of optical fiber. One of more of the loops can be circular. One of more of the loops can be non-circular, such as by having, for example, an oval shape. Two or more of the loops can be coaxial. In one practice, all loops received by the inwardly facing surface are substantially coaxial. The inwardly facing surface can comprise a helical groove receiving the loops of optical fiber.

Responsive to receiving light of a first wavelength the rare earth can provide light of a second wavelength that is different than the first wavelength and the fiber can be normally multimode at the second wavelength. The loops can be shaped such that higher order modes are attenuated substantially more than a fundamental mode of the fiber.

The apparatus can comprise a light source optically coupled to the optical fiber for providing the light of the first wavelength. The apparatus can also comprise a second light source optically coupled to the optical fiber for providing light of the second wavelength. The apparatus can comprise at least one fiber grating, which can reflect light of a selected wavelength, such as, for example, light of the second wavelength.

In another aspect, apparatus according to the invention, such as the apparatus described elsewhere herein as having a body, can comprise a second body that can be mated with the body, where the second body has an outer surface that faces the inwardly facing surface of the body when the bodies are mated. In one practice, the second body can be removeably and replaceably mated with the body. For example, the second body can comprise a split ring that can be compressed for facilitating mating of the second body with the body.

In yet an additional aspect, the invention can provide an optical apparatus comprising first and second bodies adapted for being mated together to define a plurality of passages for housing a plurality of loops of a length of optical fiber. The plurality of loops can be coaxial, and alternatively or additionally, can have substantially the same radius of curvature. The plurality of passages can comprise a helical passage. Each of the plurality of passages can comprise a closed cross section.

The invention can also include methods. In one practice, the invention provides a method of accommodating a loop or loops of optical fiber, comprising the steps of providing a body; providing a length of optical fiber, the fiber comprising a rare earth; and receiving a plurality of loops of the fiber with a surface of the body, the plurality further being received such that the body can physically expand without subjecting the plurality of loops to a substantial increase in tension. The body can comprise an inwardly facing surface for receiving at least part of the outer face of each of the plurality of loops. The inwardly facing can comprise a helical groove for receiving the plurality of loops. All of the loops of the plurality can be coaxial. Alternatively or additionally, all of the loops can have substantially the same shape.

A body of an apparatus according to the invention can comprise at least one of aluminum and copper, and can generally comprise a ring shape. The apparatus can comprise means for increasing heat transfer to or from the body. The apparatus can comprise at least one passageway for a section of the length of fiber to pass from the plurality of loops. The passageway can be arranged such that the section of the length of fiber from the loop enters the passageway substantially along a tangent to one of the plurality of loops. The apparatus can comprise the length of optical fiber.

Further advantages, novel features, and objects of the invention will become apparent from the following detailed description of non-limiting embodiments of the invention when considered in conjunction with the accompanying FIGURES, which are schematic and which are not necessarily drawn to scale. For purposes of clarity, not every component is labeled in every one of the following FIGURES, nor is every component of each embodiment of the invention shown where illustration is not considered necessary to allow those of ordinary skill in the art to understand the invention.

BRIEF DESCRIPTION OF THE DRAWINGS

FIG. 2 is a cross section of the apparatus of FIG. 1, taken along section line 2-2 shown in FIG. 1;

FIG. 3 is a view of the body of FIG. 1 taken along section 3-3 of FIG. 1;

DETAILED DESCRIPTION

Figure 1:
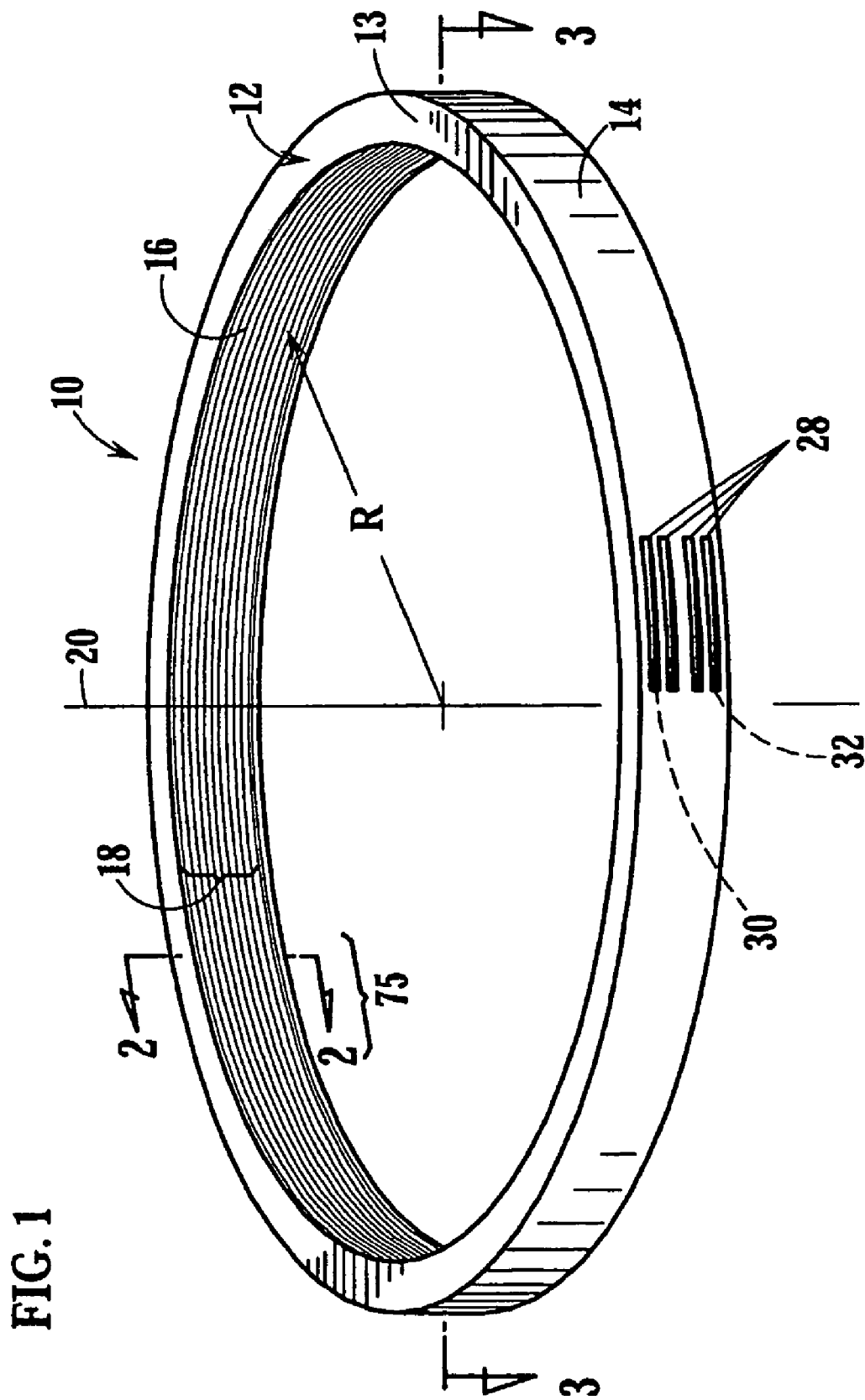
FIG. 1 is a perspective view of one embodiment of an apparatus according to the invention.

FIG. 1 is a perspective view of one embodiment of an optical apparatus 10 according to invention. The optical apparatus 10 can include a body 12 comprising a top surface 13, an outer surface 14 and an inwardly facing surface 16. The inwardly facing surface 16 can receive a plurality of loops of a length of optical fiber, and can include a plurality of grooves or slots, as indicated generally by reference numeral 18. Typically the plurality of loops of optical fiber, which are not shown in FIG. 1, as well as the plurality of grooves or slots, are coaxial about the common axis 20. Furthermore, each of the plurality of loops of optical fiber, when received by the inwardly facing surface 16 of the body 12, is typically circular. The plurality of loops can have substantially the same radius of curvature, which radius is indicated by the designation "R" in FIG. 1. The body 12 is shown in FIG. 1 as having a general ring shape, though other shapes are possible and within the scope of the invention. An inwardly facing surface is one wherein a normal vector to the surface has a component that is perpendicular to the axis 20, and this perpendicular component points inwardly toward the axis 20. In other words, comparing the region bounded by a loop of fiber to the region outside the loop of fiber, the normal to the surface would be said to point more toward the region bounded by a loop of the fiber rather than toward the region outside of the loop of fiber. R can be less than about 10 mm, less than about 9 mm, less than about 8 mm, less than about 7 mm, less than about 6 mm, or less than about 5

Typically the plurality of grooves 18 shown in FIG. 1 are formed from a single groove that is helical, meaning that it advances along the axial direction 20, such as, for example, screw threads are known to advance. Typically the pitch (spacing of the centers of the grooves) of the grooves 18 is on the order of the diameter of the fiber to be received by the inwardly facing surface 16, such as, for example, by being from about 1 to about 5 diameters of the fiber to be received, or, as another example, by being approximately 1.5, 2.5, 3.5, 4.5 or 5.5 diameters of the fiber to be received.

The body 12 can comprise one or more of a variety of materials, such as, for example, a metal, a ceramic or glass. The body 12 can be unitary. Typically the body 12 is unitary, and, for example, is formed by machining an appropriate piece of material, such as a metal or alloy of various metals. Copper and aluminum are both good choices because they readily conduct and/or absorb heat generated by the optical fiber loops received by the inwardly facing surface 16 away from the optical fiber loops. Alternatively the body 12 can be integral, that is, the body 12 can be formed by assembling different parts together, such as by first forming different parts to be assembled in separate steps, or can have discrete portions that are formed of different materials. For example, an alternative technique for forming the plurality of grooves is to coat a first portion of the body 12 with a deformable material and press, such as by, for example, expanding, a form (or even the loops of fiber) into the material to create grooves. The apparatus 10 thus comprises the deformable material as well as the first portion of the body.

FIG. 2 is a cross section of the apparatus of FIG. 1, taken along section line 2-2 shown in FIG. 1. Illustrated in cross section are the inwardly facing surface 16, the grooves 18, loops 40 of optical fiber, and the outer face 42 of one of the loops 40.

The outer diameter of an optical fiber can depend on the application for which the fiber is intended. In many applications, optical fiber having an outer diameter of 125 microns is standard. In other applications, an optical fiber of the present invention can have an outer diameter of several hundred microns or even larger. In the embodiment shown in FIGS. 1 and 2, the dimensions of the grooves 18 can be selected for proper reception of the loops by the inwardly facing surface 16. Typically the inwardly facing surface 16 is spaced in the radial direction no more than one or two fiber diameters from the outer face 42 of the loop of optical fiber when the loops are received by the inwardly facing surface 16. The loops of the optical fiber preferably contact the inwardly facing surface 16 at many locations when the loops are received by the inwardly facing surface 16.

The depth $d_1$ of the grooves 18 preferably exceeds the outer diameter $d_2$ of the optical fiber of the loop 40, such that the loops of optical fiber can be inside the grooves, as shown in FIG. 2.

The inwardly facing surface 16, and in particular the plurality of grooves 18, should be substantially free of burrs so as to avoid damaging the loops of optical fiber. The inwardly facing surface 16 and the grooves can be shot peened as part of the process of fabricating the body 12.

The inwardly facing surface 16 need not receive the entire length of a loop of optical fiber, typically approximately equal to $2\pi R$, where R is the radius of curvature of the loop and the diameter of the fiber is neglected. For instance, part of the body 12 could be cut away, such that the body comprises a split ring. However, it is preferable that the surface receive at least the majority of the length of each of the loops.

Returning to a consideration of FIG. 1, the body 12 can include at least one passageway 28 (four passageways are shown in FIG. 1) for a section of the length of optical fiber to pass from the plurality of loops. Such a section can be a pigtail for allowing optical communication with the loops of fiber. First and second sections of the length of optical fiber are indicated by reference numerals 30 and 32, respectively, and are shown as dotted lines, as the length of optical fiber is not otherwise shown in FIG. 1. Preferably, the passageway 28 is arranged such that the section of the fiber from the loop enters the passageway substantially along a tangent to the loop. Brief reference is made to FIG. 3, which is view taken along the section line 3-3 of the body 12 of FIG. 1, and which shows an individual loop 70, a tangent line 72 to the loop, as well as a passage 28 and the section of fiber 30. The apparatus 10 can accommodate two or more separate coils, where each coil includes one or more loops, and can include an appropriate number of passageways such that the lengths of fiber can pass to or from the coils.

The body 12 preferably includes a portion 75 wherein for at least a plurality of loops the inwardly facing surface is continuous between adjacent loops, as indicated by reference numeral 79 in FIG. 2.

Note that the length of optical fiber can include splices, and different types of fiber can be spliced together to form the length of optical fiber. For example, in one practice the at least one of the loops of a fiber received by the inwardly facing surface 16 in FIG. 1 comprise a rare earth, and the sections 30 and 32 do not comprise a rare earth, and the sections and the at least one loop can be spliced together.

In many examples of prior art practice, loops of fiber are superposed over other loops of optical fiber, such as by winding several layers of loops over a tube or rod. In one practice of the invention, the apparatus 10 does not accommodate any loops that are superposed over other loops of optical fiber. In other practices of the invention, loops are superposed over one another.

In one embodiment of the invention, the inwardly facing surface can comprise grooves, as described above. In other embodiments, an optical apparatus comprises a body having an inwardly facing surface receiving a plurality of loops of optical fiber, wherein the inwardly facing surface can be a simple flat surface.

Figure 4A:
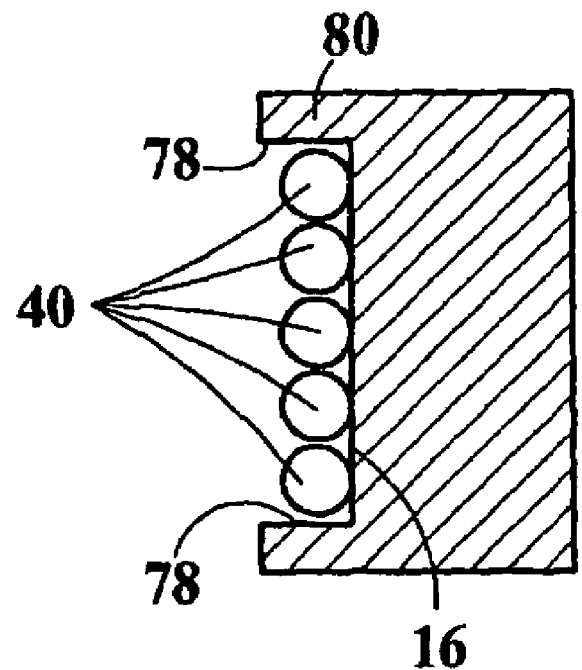
FIGS. 4A-4B illustrate alternative manners in which an inwardly facing surface of a body according to the invention can be adapted to receive optical fiber.
Figure 4B:
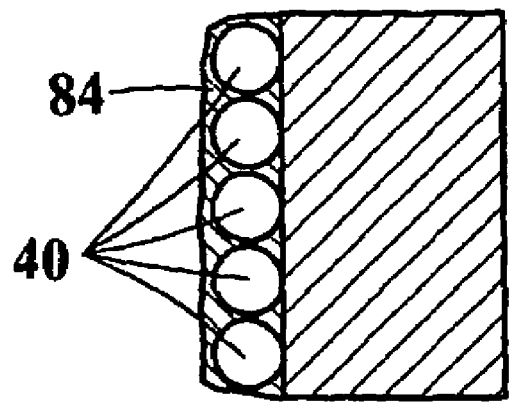

FIGS. 4A and 4B illustrate additional and/or alternative approaches for adapting a surface to receive the outer perimeter of a loop of optical fiber. FIG. 4A illustrates a surface 16 that includes surface portions 78 formed by shoulders 80. FIG. 4B shows material 84, which can be, for example, a gel, viscous substance or adhesive material.

The optical fiber can comprise a rare earth. The rare earths include elements 57-71 of the periodic table (e.g., lanthanum, cerium, praseodymium, neodymium, promethium, samarium, europium, gadolinium, terbium, dysprosium, holmium, erbium, thulium, ytterbium, and lutetium). Responsive to receiving energy of one wavelength, known in the art as the "pump" wavelength, certain rare earths can provide optical energy of a different wavelength. Fibers doped with a rare earth can thus be used as light sources, such as for example, super luminescent light sources and lasers that provide light at the second wavelength. Often the light at the second wavelength is of higher quality in terms of divergence, spatial and temporal coherence and the like. In many applications a fiber comprising a rare earth thus acts as a brightness converter that receives low quality pump and converts that light to higher quality light at a more desirable wavelength. Fibers doped with rare earths can also be used as amplifiers that amplify a signal of the other wavelength propagated by the fiber.

The process of converting pump energy to optical energy of a different wavelength is not always 100% efficient, and some energy is dissipated as heat in the optical fiber, which heat energy should be extracted from the optical fiber to avoid overheating of the fiber. Coiling the fiber on the inside of the body 12 can allow the natural spring tension of the loop, which tends to cause the loop(s) of optical fiber to expand, to promote reception of the outer faces of the loops by the inwardly facing surface 16, which can in turn promote heat transfer between the loops of the optical fiber and the body 12.

Of course the apparatus 10, such as the body 12, in some instances, may heat up sufficiently, responsive to receiving heat energy from the loops of optical fiber, such that heat should be removed from the apparatus 10. Whether the body 12 heats up appreciably depends on the rate of transfer of heat away from the body 12 in relation to the rate of transfer of heat from the loops of optical fiber to the body 12, as well as the heat capacity of the body 12.

The apparatus 10 can include various means for promoting heat transfer to and/or from the apparatus 10. For example, the body 12 of the apparatus 10 can include fins, grooves, holes, or other well known expedients that increase the surface area of the apparatus for increasing heat transfer to or from the apparatus. Heat can be transferred in a variety of manners, including convection, conduction and radiation, as is known in the art, and any one of these mechanisms, alone or in combination, can be exploited to provide means for transferring heat to or from the apparatus 10.

The pitch of the optical fiber can be determined, at least in part, by considerations related to heat transfer. For example, if the pitch is too low, the portion of the body 12 interposed between adjacent loops of fiber (see reference numerals 90 and 92 in FIG. 2, where reference numeral 90 indicates generally adjacent loops and reference numeral 92 indicates the portion interposed between adjacent loops) may become a "hot spot" that is elevated to too high a temperature. Such hot spots are preferably avoided. Judicious consideration of factors such as the pitch of the loops, the heat load from the loops of optical fiber, the nature of the heat transfer from the loops to the body 12, the heat capacity of the body 12, and the provision for transferring heat from the body 12, as well as other like factors, can be taken into account to ensure that hot spots are less likely to occur.

Figure 5:
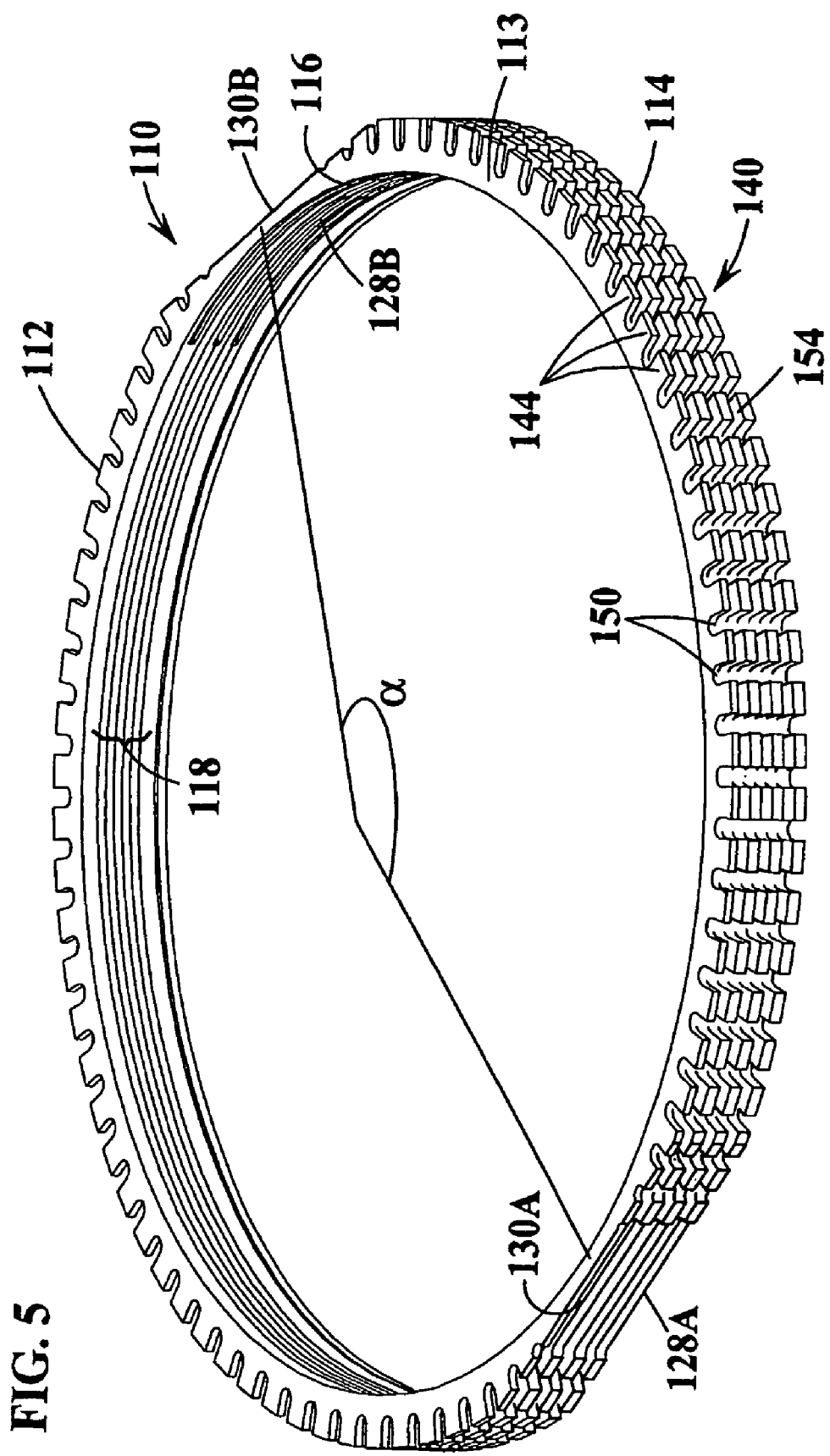
FIG. 5 is a perspective view of another embodiment of a body according to the invention.

FIG. 5 illustrates another embodiment of an apparatus 110 according to the 30 invention. The body 112 comprises a top surface 113, an outer surface 114, an inwardly facing surface 116, a plurality of grooves 118 and the passageways 128A. As with FIG. 1, a length of optical fiber comprising a plurality of loops is not shown, though one of ordinary skill in the art, in light of the disclosure herein, can readily appreciate that the loops of optical fiber are received by the inwardly facing surface 116. Note that the body 112 can include the passageway 128B that is generally opposed to passageway 128A. The apparatus 110 can include planar surfaces 130A and 130B that intersect the passages 128A and 128B respectively. The planar surfaces 130A and 130B can be flat and are oriented at the angle α shown in FIG. 5. The angle α is approximately 160° in FIG. 5, and the angle α can more generally range from 0° to 360°. In one embodiment of the invention, the angle α can be from about 25° to about 180°. The apparatus 110 can also include provision for increasing heat transfer to or from the body 112, as indicated by reference numeral 140. The body 112 includes a plurality of protuberances 144, axial grooves 150 and azimuthal grooves 154.

In certain practices a material, such as a grease, gel or the like, can be used with the loops of the optical fiber, such as by interposing the material between or near the inwardly facing surfaces 16, 116 and the loops of optical fiber. The material can promote heat transfer between the loops and the body 12, 112 and can be applied to the fiber prior to reception of the loops by the inwardly facing surface, or applied after reception, or both. The material can comprise, for example, a gel, liquid or gas.

Note that if the body does heat appreciably, in one practice of the invention, the body 12, 112 will typically expand outwardly. It is well known in the prior art to wind an optical fiber around a tube or rod, such that the tube or rod receives the at least part of inner faces of the coils of optical fiber. In this prior art technique, any outward expansion of the tube or rod, such as due to heating, can be disadvantageous in that it increases the tension in the optical fiber, which can lead to a change in the optical properties of the fiber or promote earlier failure of the fiber. It may also be necessary to wind the fiber about the rod with a certain amount of tension so as to promote reception of the coil by the tube or rod, as the natural tendency of a coil of fiber to spring apart does not tend to promote reception of the fiber by the prior art rod or tube, as it can with embodiments of the present invention. Practice of the present invention, in certain embodiments, can allow substantially tension-free accommodation of a loop or plurality of loops of optical fiber.

Figure 6:
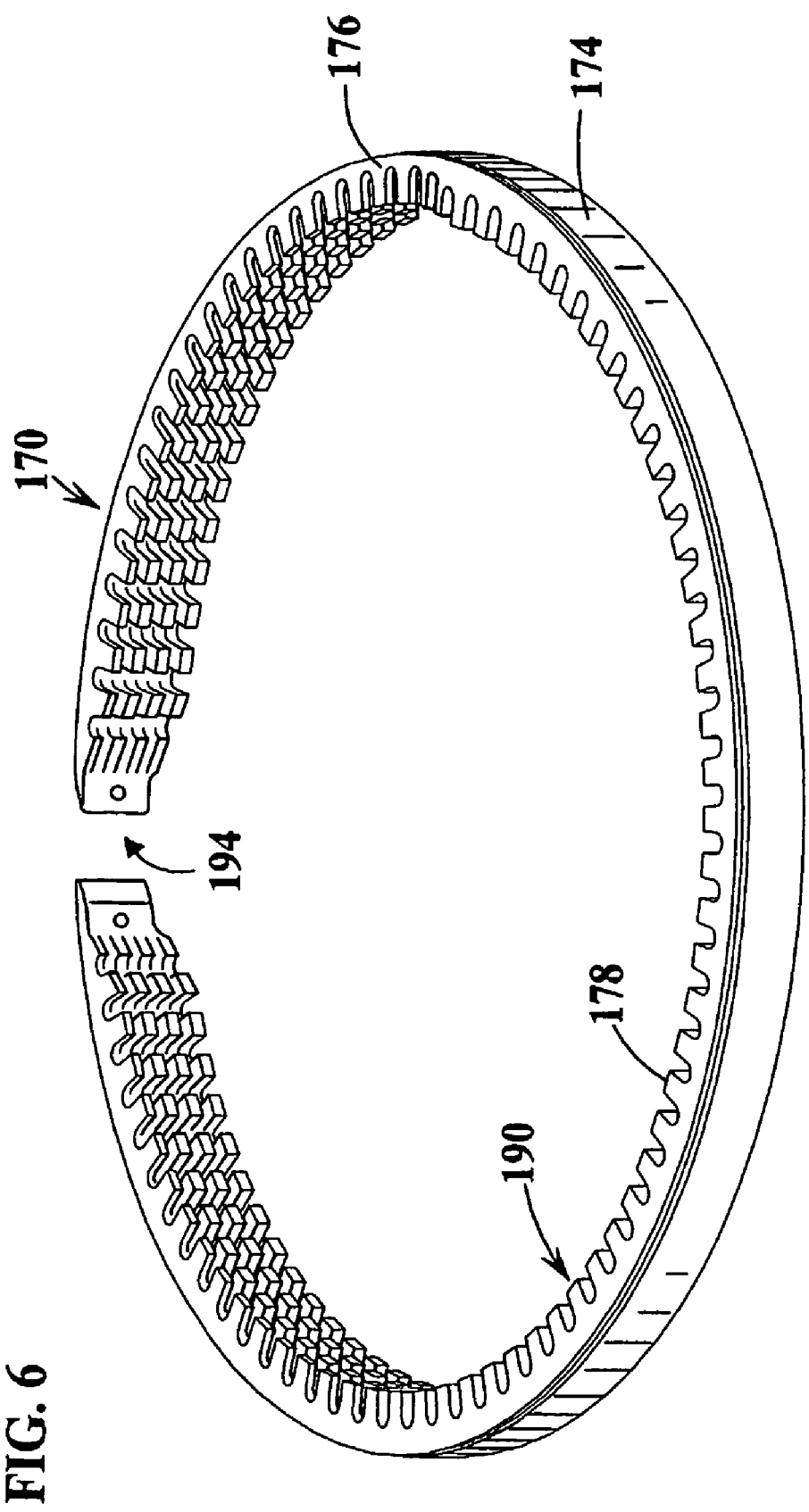
FIG. 6 is a perspective view of a body that can be mated with the body shown in FIG. 5.
Figure 7:
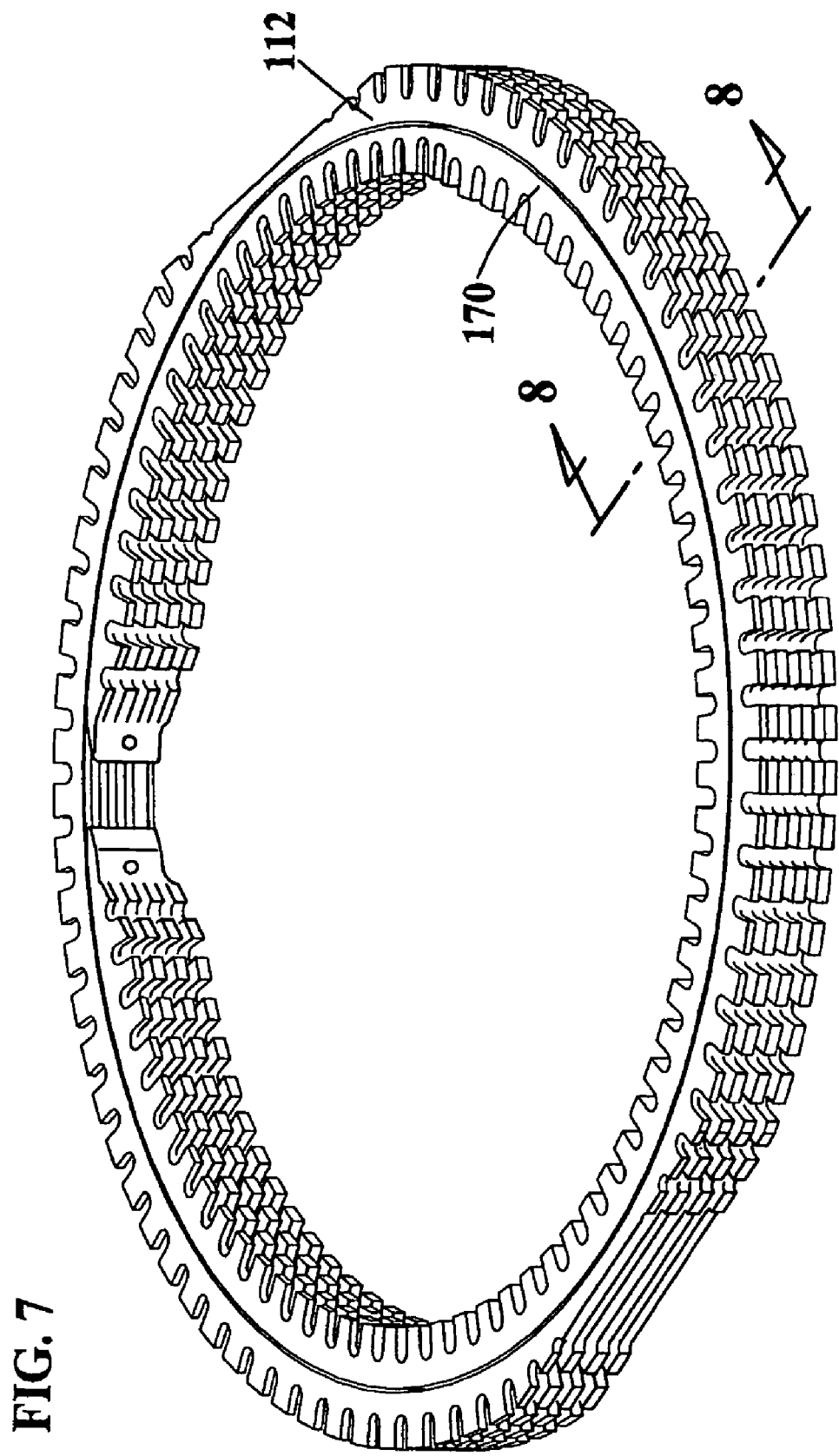
FIG. 7 is a perspective view showing the body of FIGURE mated with the body of FIG. 5.

With reference to FIGS. 6 and 7, an apparatus according to the invention can comprise a second body 170 that can be mated with the body 112. FIG. 6 illustrates the body 170 alone and FIG. 7 illustrates the body 170 mated with the body 112. With reference to FIG. 6, the body 170 can comprise an outwardly facing surface 174, a top surface 176 and an inwardly facing surface 178. The body 170 can comprise provision for promoting heat transfer to or from the body 170, as indicted by reference numeral 190.

Figure 8:
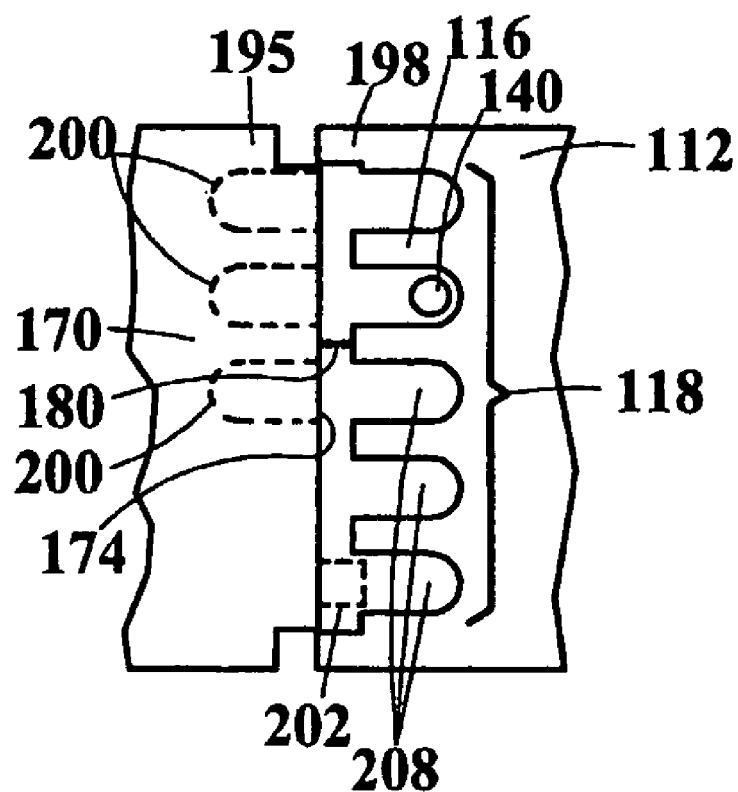
FIG. 8 is a cross section of FIG. 7 taken along section line 8-8 of FIG. 7.

Preferably the second body 170 can be removeably and replaceably mated with the body 112 for ease of removal of one body from the other. For example, as shown in FIG. 6, the second body can comprise a gap 194 such that the body can be compressed and can expand to be mated with the body 112. The body 170 can thus comprise a split ring that can be compressed for facilitating reception of the second body 170 within the body 112. FIG. 8 is a cross section of FIG. 7 taken along section line 8-8. The surface 174 of the second body 170 can face the inwardly facing surface 116 of the body 112. The surface 174 can be spaced, along the radial direction, from the surface 116, as indicated by reference numeral 180. The spacing 180 is typically on the order of a one to a few outer diameters of the optical fiber, such as for example, 1-10 diameters, or, more preferably, 1-5 diameters. As indicated in FIG. 8, the spacing need not be the same everywhere, and in various embodiments of the invention the foregoing recitation of spacing dimensions can represent the average spacing, or alternatively, the closest spacing, as indicated by reference numeral 180, or, as another example, the maximum spacing.

The outwardly facing surface 174 need not be flat, but optionally can comprise a plurality of grooves 200. The grooves 200 can oppose and can be in register with the plurality of grooves 118 comprised by the inwardly facing surface 116, as shown in FIG. 8. The outwardly facing surface 174 can also optionally comprise one more of the protuberances, one of which is indicated by reference numeral 202. The protuberances can oppose the grooves, and can be designed to penetrate the grooves.

The body 170, when mated with the body 112, defines a plurality of passages 208 for housing a plurality of loops of a length of optical fiber. The passages 208 are shown in cross section in FIG. 8, and when viewed in cross section can be generally closed. The spacing 180 does represent an opening between adjacent passages. In one embodiment of the invention, any gaps or spacing in the perimeter of the passages are less than the diameter of the optical fiber. For example, the spacing 180 can be less than the outer diameter of the fiber of the loop 140. In one embodiment of the invention, the majority of length of the perimeter of each of a plurality of the passages, when viewed in cross section, is closed. The outwardly facing surface 174 can contact the inwardly facing surface such that each of a plurality of passages is completely closed when viewed in cross section.

Preferably the surface 174 does not contact the opposing fiber loop 140 received by the inwardly facing surface 116. One of the bodies can include a recess that is received by a shoulder of the other of the bodies. For example, as shown in FIG. 8, the second body 170 can include a recess 195 that receives a shoulder 198 of the body 112. Thus in one practice of the invention the body 170 contacts the body 112 but is appropriately spaced from the fiber loop 140 when the body 170 is received by the body 112. In another practice of the invention, the body 170 can contact the fiber loops. Preferably the second body 170, when received by the body 112, does not substantially compress the loops received by the inwardly facing surface 116, and hence does not affect the optical properties of the loop 140 to detrimentally affect the desired optical performance of the loop 140.

Certain features of the invention are shown in the FIGURES herein, such as in FIGS. 1, 5 and 6. A patent disclosure is not intended to be an encyclopedic recitation of combinations of features that are deemed to be within the scope of the invention. For example, one or more of the features shown in FIG. 5 can be included with one or more features shown in FIG. 1, as is readily appreciated by one of ordinary skill in the art in light of the disclosure herein. For example, in one practice the invention, the embodiment shown in FIG. 1 can include opposed passages, but need not include the provisions shown in FIG. 5 for promoting heat transfer, or the flats shown in FIG. 5. The foregoing comments apply to the FIGURES discussed below.

In certain applications multimode fibers and/or fibers having rather low numerical apertures and larger core diameters can have advantages. For example, it is desirable to increase the power handling capability of optical fibers, and in particular to increase the power handling capability of fibers that are used in fiber lasers and fiber amplifiers. Unfortunately, nonlinear processes, such as stimulated Brillouin scattering (SBS) and stimulated Raman scattering (SRS) are responsible, in large part, for limiting the power handling capability of fibers and hence the power output of fiber lasers and amplifiers. Though these processes are complex, each can be reduced by limiting the power density in the core of the fiber. This can be accomplished by using a larger core fiber that in addition has a lower numerical aperture, such that the fiber has a larger mode field diameter. Essentially, the power of the light propagating along fiber is more spread out, such that the power density in any given area of the fiber is reduced. Fibers having large core diameters support multiple spatial modes. The presence of such modes tends to degrade the quality of the light provided by the fiber.

One useful technique described in U.S. Pat. No. 6,496,301, issued on Dec. 17, 2002 to Koplow, Kliner and Goldberg, involves coiling a normally multimode fiber to filter out, via bend loss, selected higher order modes. The selected higher order modes experience substantially higher bend loss than the non-selected (lower order) modes. All of the higher order modes can be caused to experience substantially higher attenuation such that the fiber operates in a single mode. Such a technique allows higher power operation of the fiber while maintaining the quality of the light provided by the fiber. Typically the fiber has a rather low numerical aperture, such as, for example, a numerical aperture no greater than 0.12, no greater than 0.09, or even no greater than 0.06. A numerical aperture of about 0.05 to about 0.06 can be useful. An optical fiber can have a core diameter of greater than 10 microns. The core diameter can be at least 20 microns. In certain practices of the invention, the core diameter can be no less than 30 microns, no less than 50 microns, or even no less than 100 microns. It can be important in certain applications that light have a particular polarization. Optical fiber can be coiled to provide certain properties relating the polarization of light propagated by a fiber. For example, birefringent fiber, such as polarization maintaining fiber, can be coiled so as to become a polarizing fiber, wherein one of the polarizations of a mode, such as the fundamental mode, is attenuated substantially more than the other polarization of that mode. See, for example, published U.S. Patent Application U.S. 2003/0086668, in the name of inventors Kliner and Koplow (published May 8, 2003), and published U.S. Patent Application U.S. 2002/0159139, in the names of inventors Koplow, Kliner and Goldberg, published Oct. 31, 2002. The foregoing U.S. Patents and applications are herein incorporated by reference to the extent necessary to understand the present invention.

As noted above, the optical fiber can comprise a rare earth. Additionally or alternatively, the optical fiber can be a double clad fiber. For example, the fiber can comprise a core comprising an index of refraction, a first cladding disposed about the core, and a second cladding disposed about the first cladding, where the first cladding comprises a first index of refraction and the second cladding comprises a second index of refraction that is less than the first index of refraction. Double-clad fibers are useful because they allow pump light to be more easily introduced to the core, as compared to single-clad fibers, and hence absorbed by the rare earth. The pump light can be introduced to the large (compared to the core) inner cladding and will intersect the core as it propagates down the inner cladding and reflects, due to the difference in the indices of refraction of the inner and outer claddings, from the boundary between the inner and outer claddings. The absorption of the pump light by the fiber, typically measured in per unit length of the fiber, such as in dB/meter, is a useful figure of merit for a double-clad fiber. A high absorption per unit length of the fiber is desirable, and, for a given concentration of the rare earth, indicates more interaction between the rare earth and the pump light.

Double-clad fibers are known at least from the following U.S. Patents: U.S. Pat. No. 3,808,549 issued to Maurer; U.S. Pat. No. 4,815,079 issued to Snitzer et al.; U.S. Pat. No. 5,533,163 issued to Muendel; U.S. Pat. No. 5,864,645 issued to Zellmer et al.; U.S. Pat. No. 6,157,763 issued to Grubb et al.; U.S. Pat. No. 5,949,941 issued to DiGiovanni; and U.S. Pat. No. 6,477,307 issued to Tankala et al. See also U.S. Pat. No. 6,483,973 to Mazzarese et al.

Figure 9:
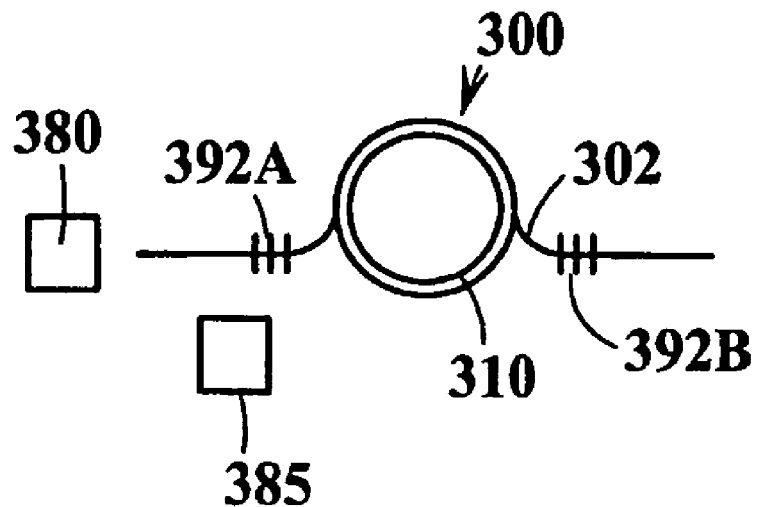
FIG. 9 illustrates an additional embodiment according to the invention.

With reference to the schematic illustration in FIG. 9, an optical apparatus 300 according to the invention can also comprise a length of optical fiber 302, where the length includes loops that include a rare earth, a body 310 comprising an inwardly facing surface receiving the loops of the optical fiber, a light source 380 optically coupled to the optical fiber 302 for providing the light of the first wavelength, as well as a second light source 385 optically coupled to the optical fiber 302 for providing light of the second wavelength. Techniques for optically coupling the light sources 380 and 385 to the optical fiber are well known in the art and need not be elaborated upon here. Such techniques include splicing, the use of an optical coupler, such as a tapered fiber coupler, side pumping of the fiber, such as the use of v-grooves and embedded mirrors and the like, as well as imaging optics, such as a pair of lenses. The optical apparatus 300 can comprise at least one reflector 392A, such as a fiber grating, for reflecting light of the second wavelength. A second reflector, 392B, which can also be a fiber grating, can be used to provide a laser cavity between the reflectors.

Optical sources are well known to those of ordinary skill in the art and can include, by way of example and not of limitation, lasers, optical amplifiers, semiconductors, such as light emitting diodes (LEDs) and diode lasers, and flash lamps.

Figure 10:
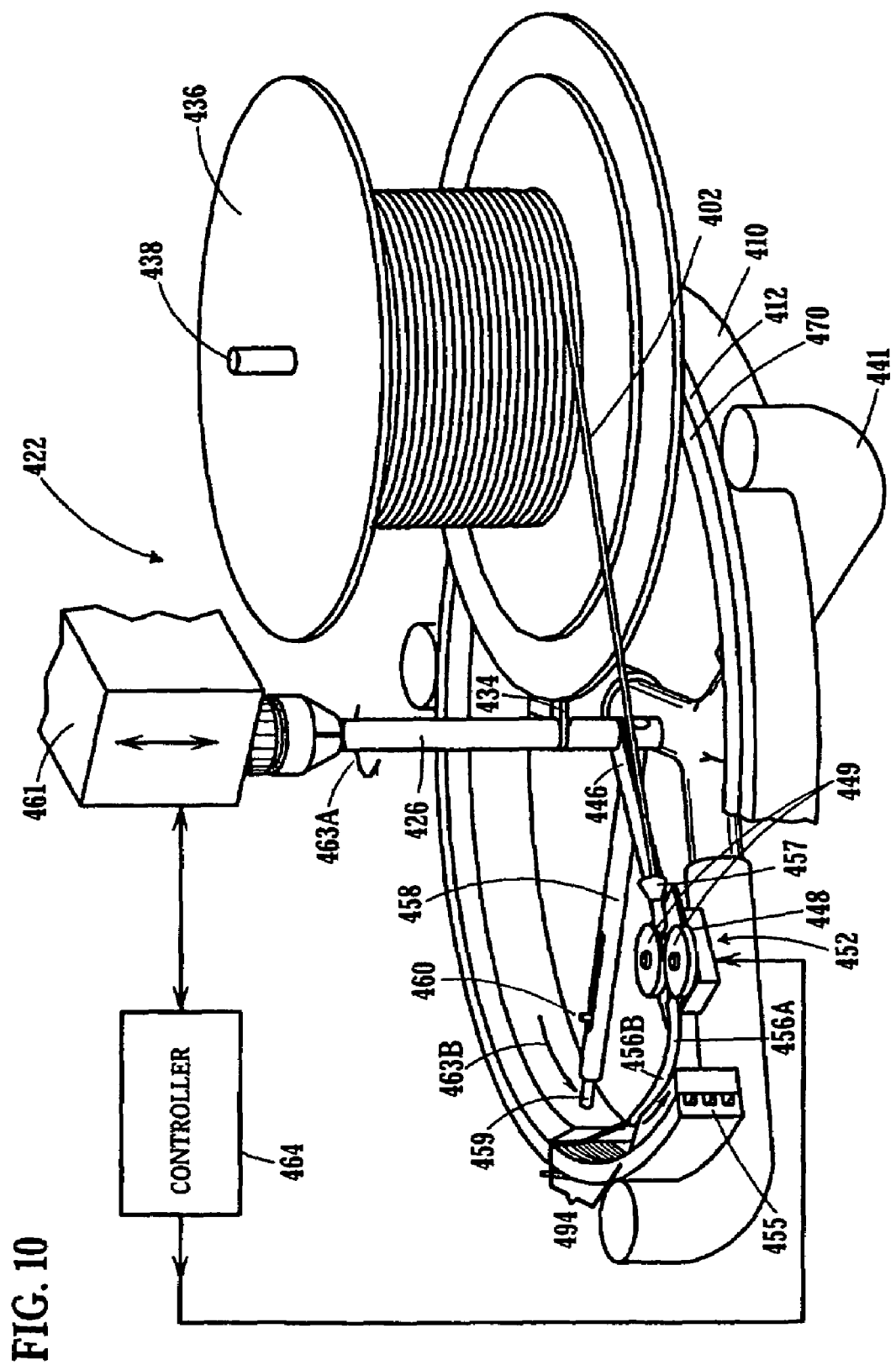
FIG. 10 is a perspective view of one embodiment of an apparatus for disposing an optical fiber with an optical apparatus intended to accommodate the optical fiber.

FIG. 10 is a perspective view of one embodiment of a first apparatus 422 for disposing an optical fiber 402 with an optical apparatus 410 intended to accommodate the optical fiber 402. With reference to FIG. 10, as well as FIG. 11, which is a top view of FIG. 10, the optical apparatus 410 can include at least one body. More typically, the optical apparatus 410 includes a first body 412 mated with a second body 470, where the length of fiber 402, when accommodated by the optical apparatus 410, can be located between the first and second bodies, 412 and 470, respectively. Preferably the first and second bodies can move relative to one another when mated for facilitating including a length of optical fiber 402 with the apparatus 410, as will be apparent from the discussion below.

The apparatus 422 can include a clamp or chuck 441, such as the triple jaw chuck shown in FIG. 10, for engaging one of the bodies, such as, for example, the first body 412. A rotational drive element 461, such as, for example, a motor, is operatively coupled to the shaft 426 for rotation thereof, as indicated by reference numeral 463A. The arm 458, operatively coupled to the shaft 426, engages the second body 470 for moving the second body 470, as indicated by arrow 463B. The arm 458 can include a spring loaded retractable pin 459, and the second body 470 can include a recess or slot (not shown) for receiving the pin 459. The pin 459 is normally urged outward and can be retracted by moving the tab 460 toward the shaft 426. Second and third arms, 434 and 446, respectively, are also operatively coupled to the shaft 426 for rotation therewith. The second arm 434 carries a spool of fiber 436 and the third arm 446 carries fiber drive element 452, which can include the tractor 448 shown in FIG. 10, that pulls fiber from the spool 436 and drives the fiber such that it is disposed with the optical apparatus 410. The spindle 438, which is coupled to the arm 434, can rotationally mount the spool 436. The optical apparatus 410 can comprise a passage into which the fiber is fed. Typically, the optical apparatus includes first and second bodies that define at least one passage therebetween. See for, example, the plurality of grooves 455, which are bounded in part by an outwardly facing wall (which faces the inwardly facing wall 416 of the first body 410) of the second body 470. The tractor 448 can feed the fiber such that it is located between the first and second bodies 412 and 470.

The tractor 448 can include wheels 449 for engaging and pulling the fiber, and a drive element (not shown), such as a motor, for driving the wheels 449. The funnel 457 can guide the fiber to the tractor wheels 449, and the guide tube, which can include a first part 456A, spaced from a second part 456B, so as to allow the drive wheels 449 to engage the fiber 402.

Typically, the chuck 441 holds the first body 412 stationary and the second body 470, which is the inner body as depicted in FIG. 10, is operatively coupled to the shaft 426 and accordingly rotates. However, as appreciated by one of ordinary skill in the art, it is the movement of the first body 412 relative to the second body 470 that facilitates including the length of optical fiber with the optical apparatus 410, and neither of the bodies need be stationary.

Figure 11:
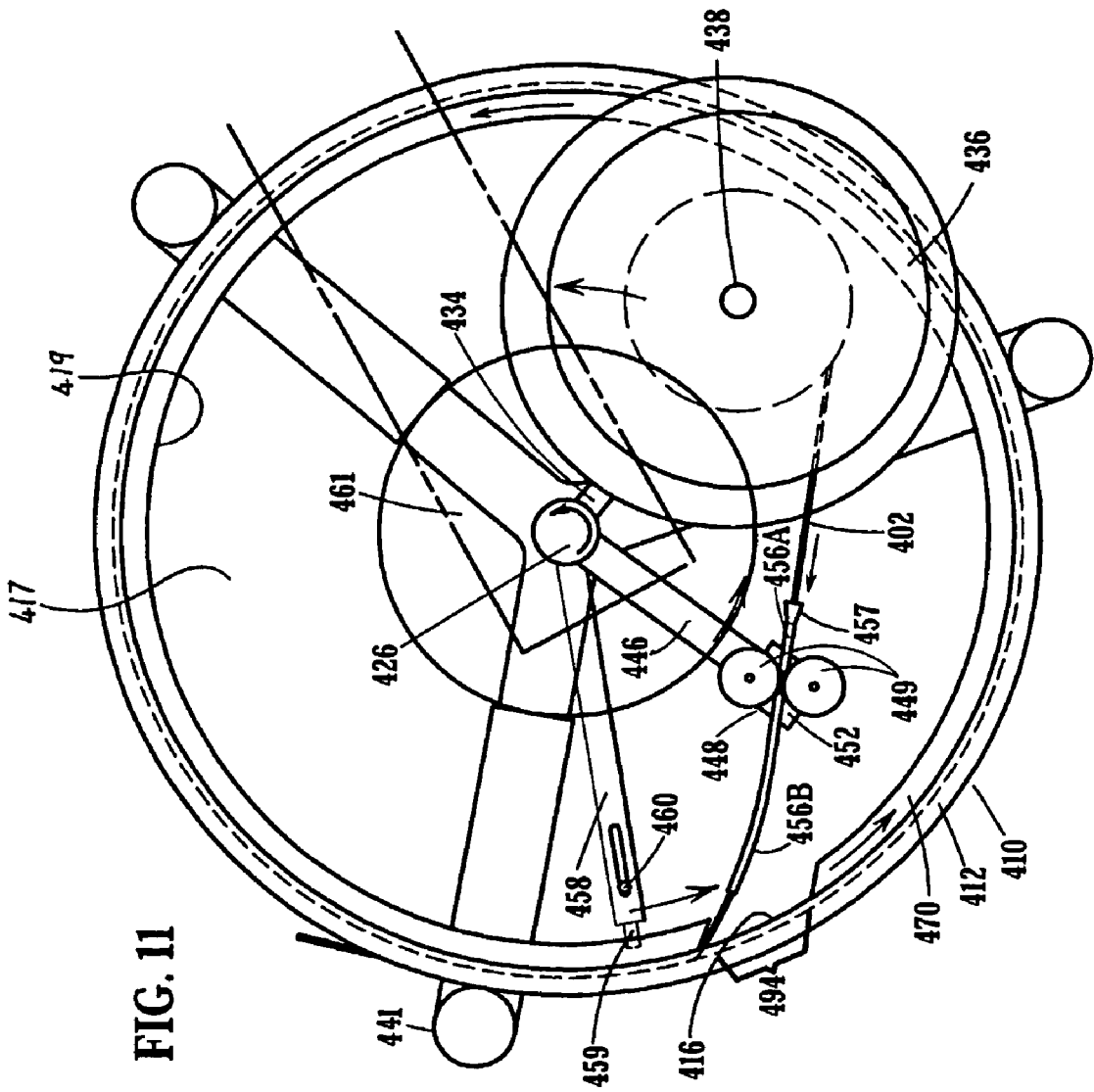
FIG. 11 is a plan view of the apparatus of FIG. 10.

Note one or more of the arms 446, 434 and 458, the fiber drive element 452, funnel 457, feeder tube 456 and the spool of fiber 436 are operatively coupled to the shaft 426 for rotation therewith, as is the second body 470 via engagement with the pin 459. With reference to FIG. 11 (and also FIGS. 12 and 13, discussed below), the fiber is disposed with the optical apparatus 410 by passing through an inner outside region 417 meaning as used herein a region that is "inner" in that it is surrounded at least in part by the optical apparatus 410 but that is "outer" in that it is not part of the optical apparatus. For example, the region 417 is surrounded, and is also bounded, in both instances at least in part, by the inwardly facing surface 419 of the second body 470 and is clearly not part of the optical apparatus. (With regard to FIGS. 12 and 13, see reference numerals 617 and 619.) The length of fiber can pass through the gap or aperture 494, which also moves, responsive to rotation of the shaft 426, as the fiber is disposed with the optical apparatus 410. The length of fiber can be received by the inwardly facing surface 416 of the first body 412. The inwardly facing surface 416 can include a plurality of grooves 455, as previously discussed. Preferably any corners or edges formed by the gap or aperture have rounded edges to avoid damaging the optical fiber.

As appreciated by one of ordinary skill in the art appraised of the disclosure herein, the controller 464 can control the fiber drive element 452 and the rotational drive element 461 in a coordinated manner so as to properly dispose the fiber with the optical apparatus 410 so as to reduce the likelihood of adversely compressing or tensioning the fiber 402.

Note that the optical apparatus 410 need not, in all cases, include the second body 470. In this case, the retractable pin 459 may not be needed. The fiber 402 can simply be disposed with the inwardly facing surface 416 of the body 412.

Figure 12:
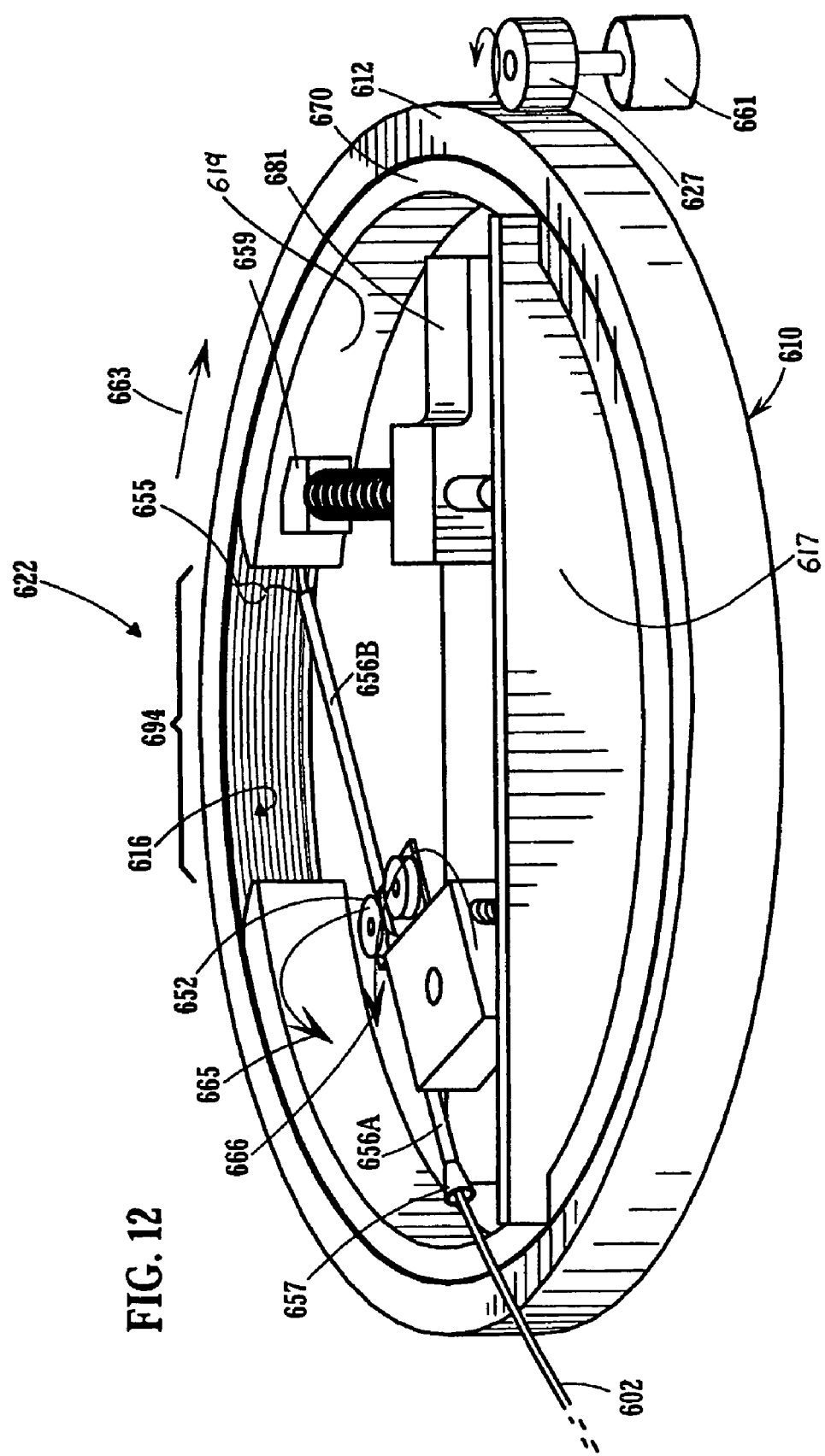
FIG. 12 illustrates a perspective view of another embodiment of an apparatus for disposing an optical fiber with an optical apparatus intended to accommodate the optical fiber.
Figure 13:
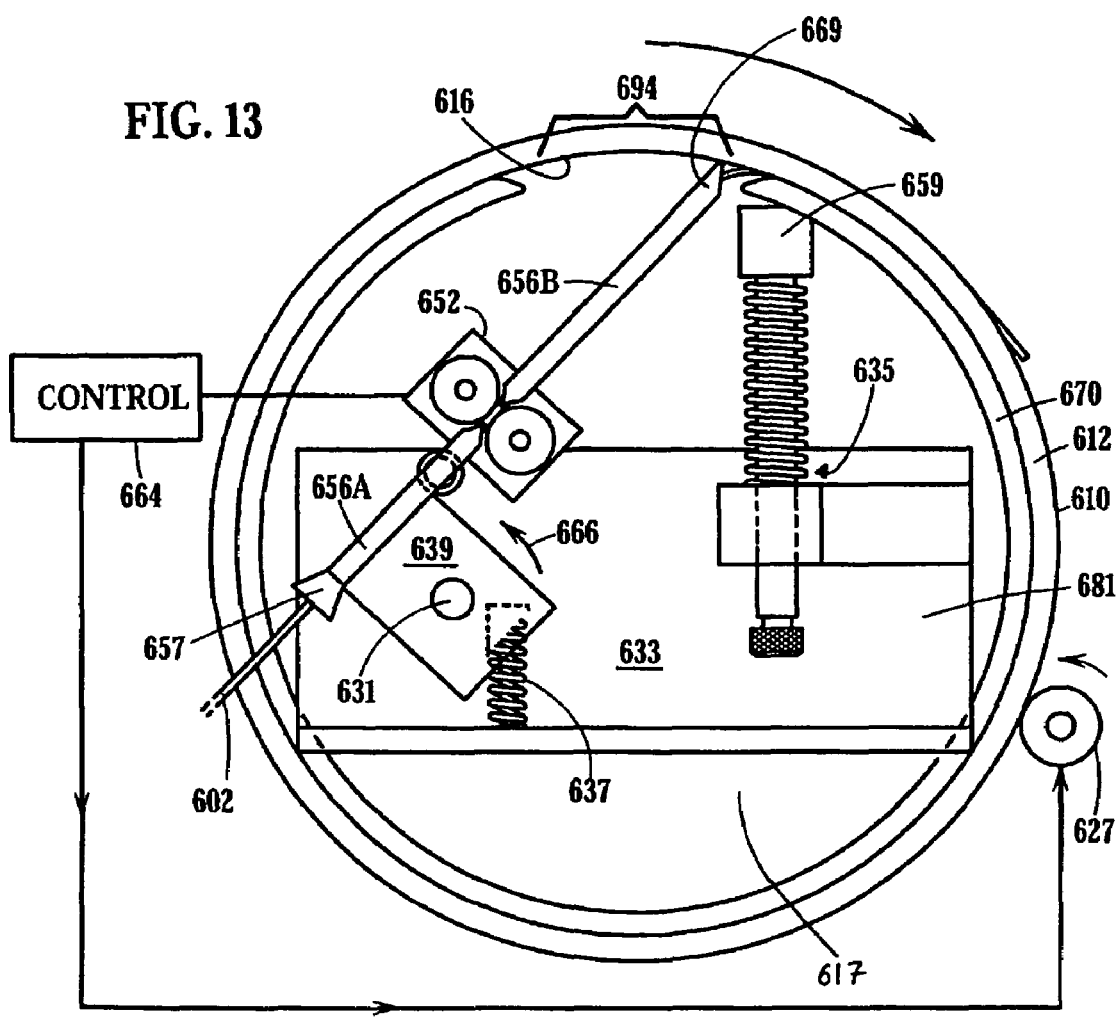
FIG. 13 is a plan view of the apparatus of FIG. 12.

Reference is now made to FIG. 12, showing another embodiment of the invention, and to FIG. 13, which is a top view of the apparatus of FIG. 12. FIG. 12 illustrates a perspective view of a second apparatus 622 for disposing an optical fiber 602 with an optical apparatus 610 intended to accommodate the optical fiber 602. The optical apparatus 610 can include at least one body, and more typically includes a first body 612 mated with a second body 670 such that one of the bodies can move (e.g., rotate) relative to the other of the bodies.

A rotational drive element 661 can be operatively coupled, via, for example, a friction drive wheel 627, to the first body 612 so as to rotate the first body 612, as indicated by reference numeral 663. A base 633, which can be secured in a vise, for example, can mount an assembly 635 that include the retractable pin 659. The retractable pin 659 can engage the second body 670 so as to allow a difference in rotation speeds between the first body 612 and the second body 670. Preferably, the second body 670 is held stationary. The fiber 602 can be provided from a spool (not shown).

The second base 639 can mount fiber drive element 652 and the first and second guide tube parts, 656A and 656B, respectively. The pin 631 can allow rotation of the fiber drive element 652 and first and second guide tube parts 656A and 656B, as indicated by reference numeral 666. The spring 637 can urge the second guide tube part 656B to approach and/or engage the inwardly facing surface 616. The guide tube 656B can include a tip 669 that can engage grooves (not shown in FIG. 13) for disposing the fiber in the grooves. With reference to FIG. 13, the guide tube 656 (the reference numeral 656 is used to refer to both guide tube parts 656A and 656B) and fiber drive element 652 can be pivotally mounted to the second base 639 such that the feed tube 656 and fiber drive element can pivot out of and into the page of FIG. 13 (much like a turntable stylus arm). The second base 639 can include a yoke (not shown) that pivots relative to the second base 639 and that engages an outer surface of the first guide tube part 656A for allowing the aforementioned pivoting. This pivoting action, indicated by reference numeral 665 of FIG. 12, can facilitate reception of the fiber by the grooves 655 of the inwardly facing surface 616, especially when the grooves 655 form a continuous helical groove. The guide tube can more readily follow the helical groove.

The second apparatus 622 of FIG. 12, as is readily appreciated by one of ordinary skill in the art, can have several features in common with the apparatus 422 of FIG. 10. For example, a controller 664 can coordinate operation of the fiber drive element 652 and rotational drive element 627, as discussed in conjunction with FIGS. 10 and 11. Reference is made to the discussion of FIGS. 10 and 11 for details of other features.

With reference to FIG. 13, one part 656A of the guide tube is spaced from the second part 656B of the guide tube to facilitate driving the fiber 602. It is considered beneficial that the spacing be kept as small as possible to minimize buckling or kinking of the fiber 602. Ends of the guide tube nearer the tractor wheels can be shaped to match the contours of the tractor wheels. The end of the guide tube 669 can be positioned to allow the fiber to exit the tube as near the inwardly facing surface 616 as is practicable. Note that the guide tube parts 456A and 456B in FIGS. 10 and 11 are similarly spaced.

Several embodiments of the invention have been described and illustrated herein. Those of ordinary skill in the art will readily envision a variety of other means and structures for performing the functions and/or obtain the results or advantages described herein and each of such variations or modifications is deemed to be within the scope of the present invention. More generally, those skilled in the art would readily appreciate that all parameters, dimensions, materials and configurations described herein are meant to be exemplary and that actual parameters, dimensions, materials and configurations will depend on specific applications for which the teaching of the present invention are used.

Those skilled in the art will recognize or be able to ascertain using no more than routine experimentation many equivalents to the specific embodiments of the invention described herein. It is therefore to be understood that the foregoing embodiments are presented by way of example only and that within the scope of the appended claims and equivalents thereto, the invention may be practiced otherwise than as specifically described. The present invention is directed to each individual feature, system, material and/or method described herein. In addition, any combination of two or more such features, systems, materials and/or methods, if such features, systems, materials and/or methods are not mutually inconsistent, is included within scope of the present invention.

In the claims as well as in the specification above all transitional phrases such as "comprising", "including", "carrying", "having", "containing", "involving" and the like are understood to be open-ended. Only the transitional phrases "consisting of" and "consisting essentially of" shall be closed or semi-closed transitional phrases, respectively, as set forth in the U.S. Patent Office Manual of Patent Examining Procedure §2111.03, 7th Edition, Revision 1. The phrase "one or more", "at least one" or the like is used at times to provide clarity; however, the absence of the employment of such a phrase is not to be taken to mean that a plurality is excluded. Absent some special definition to the contrary, the use of the term "a" or "one" carries the normal meaning in patent documents of "one or more" or 'at least one".

Having described the invention, what is claimed as new and to be secured by Letters Patent is:

1. An apparatus for accommodating optical fiber, comprising: a length of optical fiber comprising a rare earth for absorbing optical energy provided to the length of optical fiber;

and a body comprising an inwardly facing surface comprising a helical groove receiving a plurality of loops of said length of optical fiber.

2. The apparatus of claim 1 wherein said plurality of loops are substantially coaxial.

3. The apparatus of claim 1 comprising a second body that can be mated with the body, said second body having an outer surface that faces said inwardly facing surface of said body when said bodies are mated.

4. The apparatus of claim 3 wherein said second body can be removeably and replaceably mated with said body.

5. An apparatus for accommodating optical fiber, comprising:
   a body comprising an inwardly facing surface adapted for receiving a plurality of loops of a length of optical fiber, said body including at least a portion wherein said inwardly facing surface is continuous between two adjacent loops;
   a second body that can be mated with the body, said second body having an outer surface that faces said inwardly facing surface of said body when said bodies are mated; and
   wherein said second body comprises a split ring that can be compressed for facilitating mating of said second body with said body.

6. The apparatus of claim 1 wherein said body comprises at least one of aluminum and copper.

7. The apparatus of claim 1 wherein said body generally comprises a ring shape.

8. The apparatus of claim 1 wherein said body comprises means for increasing heat transfer to or from the body.

9. The apparatus of claim 1 comprising at least one passageway for a section of said length of fiber to pass from said plurality of loops.

10. The apparatus of claim 9 wherein said passageway is arranged such that said section of said length of fiber from said loop enters said passageway substantially along a tangent to one of said plurality of loops.

11. The apparatus of claim 1 wherein one or more of said loops of said plurality is circular.

12. An optical apparatus, comprising:
   a length of optical fiber comprising a rare earth, said length of optical fiber comprising a plurality of loops;
   a body comprising an inwardly facing surface receiving said plurality of loops of said length of optical fiber;
   a second body that can be mated with said body, said second body having an outer surface that faces said inwardly facing surface of said body when said bodies are mated; and
   wherein said second body comprises a split ring that can be compressed for facilitating mating of said second body with said body.

13. A method of disposing optical fiber with an optical apparatus for accommodating the optical fiber, comprising:
   providing an optical fiber;
   providing first and second bodies mated together, the mated bodies defining at least one passage bounded at least in part by the first and second bodies;
   disposing a length of the optical fiber into at least one loop within the at least one passage while providing relative movement between the first and second bodies.

14. The method of claim 13 wherein disposing the length of optical fiber includes passing the length of fiber through an outside region surrounded at least in part by one of the bodies.

15. The method of claim 13 wherein the first body, when mated with the second body, surrounds the second body and wherein moving one of the bodies includes rotating the first body.

16. The method of claim 15 wherein the first and second bodies each comprise a ring shape.

17. The apparatus of claim 1 wherein said optical energy to be absorbed by said rare earth can have a first wavelength and said length of optical fiber can convert said optical energy to optical energy having a second wavelength that is different than said first wavelength and wherein said length of optical fiber is normally multimode at said second wavelength.

18. The apparatus of claim 17 wherein said plurality of loops are shaped such that for optical energy having said second wavelength higher order modes are attenuated substantially more than a fundamental mode of said length of optical fiber.

19. The apparatus of claim 1 comprising a light source optically coupled to said length of optical fiber for providing optical energy to said length of optical fiber.

20. The apparatus of claim 19 wherein said light source can provide said optical energy for said rare earth to absorb, said optical energy having a first wavelength, and wherein said apparatus comprises a second light source optically coupled to said optical fiber for providing light having a second wavelength that is different than said first wavelength.

21. The apparatus of claim 19 wherein said light source can provide said optical energy for said rare earth to absorb, said optical energy having a first wavelength, and wherein said length of optical fiber can convert said optical energy to optical energy having a second wavelength that is different than said first wavelength, and wherein said apparatus includes at least one optical fiber grating that forms at least part of a laser cavity for light having said second wavelength.

22. The apparatus of claim 1 wherein said plurality of loops have substantially the same radius of curvature.

\* \* \* \* \*